(No Model.)
B. B. LEWIS.
BOTTLE STOPPER ATTACHMENT.
No. 254,345. Patented Feb. 28, 1882.
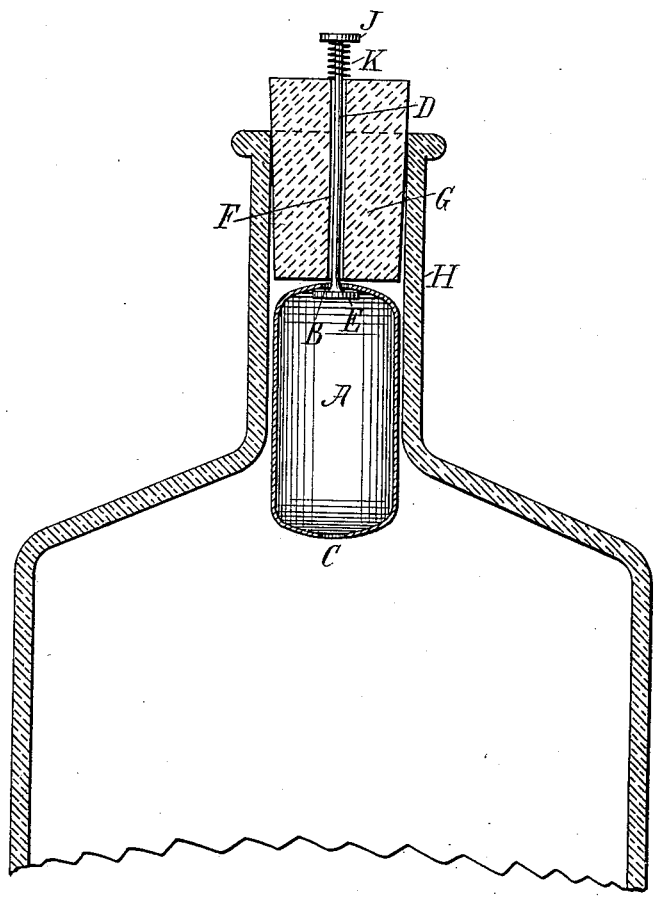
Witnesses.
Wm A Dalton
J. W. Parrott
Inventor.
Benjamin B Lewis

UNITED STATES PATENT OFFICE.

BENJAMIN B. LEWIS, OF WEST STRATFORD, CONNECTICUT.

BOTTLE-STOPPER ATTACHMENT.

SPECIFICATION forming part of Letters Patent No. 254,345, dated February 28, 1882.

Application filed November 10, 1881. (No model.)

*To all whom it may concern:*

Be it known that I, BENJAMIN B. LEWIS, of West Stratford, in the county of Fairfield and State of Connecticut, have invented a new and Improved Bottle-Stopper Attachment, of which the following is a full, clear, and exact description.

The object of my invention is to facilitate measuring quantities of the liquid contained in the bottle.

The invention consists in a receptacle or vessel holding a designated quantity of liquid and provided with end apertures, the upper one of which is closed by a valve attached to a rod passing through the stopper and pressed toward the top of the stopper by a spring, whereby the vessel will be suspended from this rod, and at the same time the upper aperture of the vessel is closed. If the vessel is to be filled, the bottle is inverted and the rod pressed inward to open the valve and admit the liquid through the upper aperture into the vessel.

Reference is to be had to the accompanying drawing, in which a cross-sectional elevation of my improved bottle-stopper attachment is shown.

A cylindrical or like vessel, A, or receptacle which can hold a certain quantity of liquid—for instance, a tea-spoonful or an ounce—is provided with an aperture, B, in its upper end and with an aperture, C, in its lower end. A rod, D, passes through the upper aperture, B, and has a plate, E, of greater diameter or size than the aperture B, attached to its end, so that the vessel A will hang on or be suspended from this plate E, which is in the inside of the vessel A, as shown.

The rod D passes up through a longitudinal aperture, F, in the stopper G of the bottle H, and has a knob or plate, J, at its upper end, between which knob J and the top of the stopper G a spiral or other spring, K, is interposed, this spring preferably surrounding the rod D. The rod D must necessarily be longer than the stopper, so that when the upper end of the vessel A rests against the bottom of the stopper by the action of the spring K the upper end of the rod D will project a certain distance above the top of the stopper.

If a certain quantity of the liquid (medicines, &c.)—that is, as much as the vessel A will hold—is to be drawn from the bottle H, the bottle is inverted and the knob or plate J is pressed against the top of the stopper G, whereby the aperture B will be opened and the liquid will flow through this aperture into the vessel A, the air escaping from the vessel through the aperture C. The vessel A must necessarily be of such size as to leave sufficient space between the side of the vessel and the neck of the bottle for the liquid to pass to the aperture B. If the rod D is released, the spring K draws it upward—that is, toward the outer end of the stopper—whereby the plate E closes the aperture B. If the bottle is placed right side up, the liquid cannot flow through the aperture C, as the pressure of the air prevents this, for as the plate E keeps the aperture B closed no air can pass into the vessel A through this aperture B.

The plate E is preferably provided with a packing-strip of rubber, cork, &c., so that it will close the aperture B more effectually.

To discharge the vessel A it is held, removed from the bottle, in the position shown, and the valve is opened by depressing the rod D. The liquid will then flow from the opening C.

The supporting-rod D, where it passes within the measuring-vessel A, may terminate with a cross-bar or other enlargement instead of the valve, which will answer to support the measuring-vessel, and the valve effect may be produced by lifting the rod D, and thus bringing the aperture in contact with the supporting-stopper G, or other prepared surface at the bottom of the stopper.

The measuring apparatus described may also be used either with or without the spring K shown in the drawing.

I do not claim as new the combination of the vessel and valve operating to retain its contents by atmospheric pressure, as vessels of various kinds have been constructed employing that combination.

Having thus fully described my invention, what I claim as new, and desire to secure by Letters Patent, is—

1. The combination, with the stopper G, having an aperture, F, of the rod D, having the enlargement or valve E, either with or without the spring K, and the vessel A, having the end apertures, B and C, substantially as herein shown and described, and for the purpose set forth.

2. As an article of merchandise, the stopper attachment consisting of the vessel A, having the end apertures, B and C, and the rod D, having the enlargement or valve E, either with or without the spring K, intended for application to a stopper in the manner and for the purpose set forth.

In testimony that I claim the foregoing I have hereunto set my hand this 15th day of October, 1881.

BENJAMIN B. LEWIS.

Witnesses:
THOMAS BRUNS,
J. W. PARROTT.